United States Patent [19]

Mitchell et al.

[11] Patent Number: 4,772,290

[45] Date of Patent: Sep. 20, 1988

[54] LIQUID HYDROGEN PEROXIDE/PERACID PRECURSOR BLEACH: ACIDIC AQUEOUS MEDIUM CONTAINING SOLID PERACID PRECURSOR ACTIVATOR

[75] Inventors: James D. Mitchell, Pleasanton; Daniel T. Carty, Danville; Alfred G. Zielske, Pleasanton, all of Calif.

[73] Assignee: Clorox Company, Oakland, Calif.

[21] Appl. No.: 838,148

[22] Filed: Mar. 10, 1986

[51] Int. Cl.$^4$ ........................ D06L 3/00; D06L 3/02; A62D 3/00; C01B 15/00

[52] U.S. Cl. ........................ 8/107; 8/101; 8/102; 8/111; 252/186.23

[58] Field of Search ........................ 8/107, 111

[56] References Cited

U.S. PATENT DOCUMENTS

| | | | |
|---|---|---|---|
| 3,687,627 | 8/1972 | Stalter | 423/271 |
| 3,740,187 | 6/1973 | Kowalski | 8/111 |
| 3,956,159 | 5/1976 | Jones | 252/104 |
| 3,970,575 | 7/1976 | Barrett, Jr. | 252/95 |
| 3,996,152 | 12/1976 | Edwards et al. | 252/186 |
| 4,017,412 | 4/1977 | Bradley | 252/186 |
| 4,086,175 | 4/1978 | Kravetz et al. | 252/99 |
| 4,130,501 | 12/1978 | Lutz et al. | 252/196 |
| 4,238,192 | 12/1980 | Kandathil | 8/111 |
| 4,283,301 | 4/1981 | Diehl | 252/102 |
| 4,367,156 | 1/1983 | Diehl | 252/102 |
| 4,374,035 | 2/1983 | Bossu | 252/91 |
| 4,391,723 | 7/1983 | Bacon et al. | 252/90 |
| 4,391,724 | 4/1983 | Bacon | 252/90 |
| 4,391,725 | 7/1983 | Bossu | 252/90 |
| 4,407,919 | 9/1983 | Goffinet | 252/102 |
| 4,412,934 | 11/1983 | Chung et al. | 252/186.38 |
| 4,421,668 | 12/1983 | Cox | 252/174.12 |
| 4,430,236 | 2/1984 | Franks | 252/95 |
| 4,457,760 | 7/1984 | Cholley | 8/111 |

FOREIGN PATENT DOCUMENTS

| | | |
|---|---|---|
| 70067 | 9/1982 | European Pat. Off. . |
| 70066 | 10/1982 | European Pat. Off. . |
| 68547 | 1/1983 | European Pat. Off. . |
| 75419 | 3/1983 | European Pat. Off. . |
| 98129 | 1/1984 | European Pat. Off. . |
| 105672 | 4/1984 | European Pat. Off. . |
| 105673 | 4/1984 | European Pat. Off. . |
| 22101167 | 1/1983 | United Kingdom . |

OTHER PUBLICATIONS

Kirk-Othmer, *Encyclopedia of Chemical Technology*, 3rd. ed. 22, pp. 360–377 (1983).

*Primary Examiner*—A. Lionel Clingman

*Attorney, Agent, or Firm*—Ciotti & Murashige Irell & Manella

[57] ABSTRACT

Storage-stable, low temperature-active liquid hydrogen peroxide laundry bleaching compositions are provided. The compositions contain a dispersion of a solid particulate peracid activator in acidic aqueous hydrogen peroxide. The activator is insoluble at the acidic conditions of storage but dissolves and activates the hydrogen peroxide at the alkaline conditions of use in laundry. Optionally the bleaching compositions can contain optical brighteners, surfactants, and/or fabric softeners.

15 Claims, No Drawings

LIQUID HYDROGEN PEROXIDE/PERACID PRECURSOR BLEACH: ACIDIC AQUEOUS MEDIUM CONTAINING SOLID PERACID PRECURSOR ACTIVATOR

FIELD OF THE INVENTION

This invention relates to peroxy bleaching compositions and in particular to stable liquid laundry bleach formulations which contain activators in combination with liquid hydrogen peroxide.

BACKGROUND OF THE INVENTION

Laundry bleaches can be classified by chemical type—chlorine bleaches and active oxygen, i.e. peroxygen, bleaches—and by physical form—solid and liquid.

The peroxygen bleaches can employ liquid hydrogen peroxide, solid organic peroxy acids, or solid inorganic peroxy salts and can offer a number of advantages. Peroxygen bleaches are safe to fabric colors and are relatively nonyellowing to white fabric. They are nondestructive to the physical strength of the fabric and impart a good handle and absorbency to the fabric.

Such peroxygen bleaches have been used for stain and soil removal in two distinct laundry settings. The first setting employs high wash temperatures, particularly over 85° C. and commonly about 100° C. as are often found in commercial laundries and in some European domestic laundries. At these high temperatures a peroxygen material such as hydrogen peroxide or sodium perborate or percarbonate can be added to the wash mixture and will give effective bleaching. Lower temperatures are typically found in United States domestic washing machines. Hydrogen peroxide in combination with activators has been disclosed for this application and a range of materials have been proposed as activators for peroxygen bleaches to enhance bleaching at low to moderate temperatures.

The selection of peroxygen bleach-activator combinations is a complex balancing of two contradictory characteristics. The combination must be shelf-stable and undergo a loss of no more than 10–20% of its activity over a 90 day period at 15°–30° C. On the other hand, the combination must be so reactive that when added to a cold water (10°–30° C.) laundry solution, it will react substantially in 1–2 minutes so as to be effective through most of the 10–12 minute wash period of an automatic washer cycle. Thus, a peroxygen compound-activator combination must exhibit a reaction rate in the washing machine that is 10,000 to 100,000 times as fast as the decomposition rate which is tolerable during storage. With solid or dry powder compositions, shelf stability can be achieved by mixing the solid persalt and solid activator as dry powders, and so long as they are kept dry during storage, no significant reaction or loss of activity will occur until the mixture is added to the washing machine. In high humidity environments such as often occur in laundry rooms, dry products can become damp and lose activity. When liquid hydrogen peroxide is employed as the peroxide source, it is not possible to have a dry powder product.

There have also been several proposals for liquid peroxide bleaches heretofore. However, none of these have disclosed how to incorporate activators and achieve a storage-stable product.

Barrett, Jr. in U.S. Pat. No. 3,970,575 shows a hydrogen peroxide bleach product which is acid-stabilized but which is not seen to contain any activator.

Jones in U.S. Pat. No. 3,956,159 shows a liquid bleach based on organic peroxyacids and their salts in an anhydrous organic ternary solvent.

Edwards et al in U.S. Pat. No. 3,996,152 shows a fluid product which employs a suspension of water-insoluble solid peroxygen compound, a nonstarch thickener, and an acidifier in a liquid carrier such as water. In light of the requirement that the peroxygen compound be water-insoluble, hydrogen peroxide would not be applicable to this system.

Bradley in U.S. Pat. No. 4,017,412 shows the same type of system as does Edwards et al but uses a starch thickener.

Kandathill in U.S. Pat. No. 4,238,192 shows a hydrogen peroxide-based liquid bleach. It does not appear to contain any activators but has acid to give a pH of 2.8 to 5.5 and a nitrogen compound (in particular, an amino acid) to give stability.

Lutz et al in U.S. Pat. No. 4,130,501 discloses a liquid hydrogen peroxide bleach to which has been added a surfactant and a thickening agent, again with no specific recitation of having an activator present in the mixture.

Thus, those references in the art which are directed to stable liquid peroxygen bleaches do not address the need to have activator present while those references dealing with activator systems do not address how to select or use an activator in a way which will work in a long term stable liquid bleach based on hydrogen peroxide.

It is against this background and in light of the particular problems posed by a liquid bleach which is based on hydrogen peroxide and must be storage stable on the one hand but must contain activators to give good bleaching performance at low to moderate wash temperatures that the present invention has been made.

STATEMENT OF THE INVENTION

The present invention now provides a shelf stable liquid peroxygen bleach composition which contains a peracid-forming activator. The bleach composition of the invention is water-based. It is mildly acidic and contains an effective bleach-producing amount of hydrogen peroxide and a suspended or dispersed solid peracid precursor activator which is characterized as being insoluble in water at the acidic pHs of storage and soluble in water at the pHs of laundry use, which are neutral or basic.

In another aspect, the present invention provides an improved method of bleaching soils and stains from laundry which comprises contacting the laundry with a 10° C. to 75° C. aqueous wash water having a pH of 7.0 or greater to which has been added an effective bleaching amount of a liquid bleach comprised of acidic aqueous hydrogen peroxide and a suspension or dispersion of a solid particulate peracid precursor activator which activator is insoluble in water at acidic pHs but soluble in water at pHs of 7.0 or greater.

DETAILED DESCRIPTION OF THE INVENTION

In this specification and its appended claims several terms will be employed which are defined as have the following meanings:

A solid is defined to be "insoluble" in the acidic liquid bleach when its maximum solubility is less than 1.0% by weight in the liquid, and preferably when its minimum solubility is less than 0.5% by weight in the liquid.

In accord with the invention, the activator should be at least 10 times as soluble in the wash liquid as it is in the concentrated liquid bleach. Preferably the activator is at least 50 times as soluble in the wash liquid as it is in the concentrated liquid bleach and more preferably at least 100 times as soluble.

The bleaching compositions of this invention include liquid hydrogen peroxide and an acidic aqueous medium with a particulate solid activator dispersed or suspended therein.

The concentration of hydrogen peroxide in the composition is an effective bleach-producing concentration which is generally controlled to between about 1% by weight and about 25% by weight, with $H_2O_2$ concentrations of from about 2% to about 20% being preferred and concentrations of from about 3% to about 10% being more preferred.

The pH of the composition is maintained mildly acidic, that is at a pH of from about 2.0 to just below 7.0, preferably from about 2.0 to about 6.0 and more preferably from about 2.0 to about 5.0. Lower pHs, while useable technically, offer corrosivity hazards that may be unacceptable in a widely sold household laundry product. Such pHs in the about 2.0 to 7.0 range can be attained by the addition of appropriate acidifiers such as organic or inorganic acids, acidic salts which buffer pH to an acid value or the activator itself which may liberate hydronium ions and give an acidic pH. Examples of suitable acidifiers are inorganic acids such as sulfuric acid, sulfurous acid, hydrochloric acid and phosphoric acid; organic acids such as acetic acid, alkyl sulfonic acids and tartaric acid; and acidic salts such as sodium hydrogen phosphate, potassium hydrogen phthalate and the like. A combination of acidifiers may be used if desired. Although not understood with certainty, it appears that the acidic pH employed in the composition serves two synergistic functions—for one it stabilizes the peroxide by driving the perhydrolysis reaction equilibrium in the direction of the unionized RCOOH acid form and away from the active $OOH^-$—for the other it removes the destabilizing activator from solution by rendering it insoluble.

The activators employed in the bleaching compositions of the invention may be characterized as being "insoluble" at pHs of storage and also being 10, 50 or 100 times as soluble at pHs of use in bleaching. The pH of bleaching is 7 or greater. The pH of storage is less than 7. Activators which can exhibit this pH-dependent solubility are activators containing weakly acidic groups such as free carboxylic acid groups, sulfonamide groups, thiocarboxylic acid groups, aromatic hydroxyls, or thiols, anhydrides, and cyclic amide groups as solubilizers. At acidic pHs such groups are not ionized and contribute to insolubility. At basic pHs these groups become increasingly ionized and solubilize the activator. These groups appear to be uniquely suited as solubilizers in this setting. Sulfonate or phosphonate groups are not acceptable because they are extensively ionized, and lead to extensive activator solubilization at the acidic pH's where nonionization and insolubilization are sought. Quaternary ammonium groups are inappropriate as well as they will tend to form ion pairs with anions present in the wash mixture. Thus, the activators employed herein can be classified as containing ionizable solubilizing groups that are substantially unionized at conditions of storage and substantially ionized at conditions of use and as containing no sulfonate, phosphonate or quaternary ammonium groups. Representative suitable solubilizing groups are aromatic and aliphatic carboxylic acids and thioacids and their alkali and alkaline earth metal salts, as well as aromatic alcohols and aromatic thiols, aromatic anhydrides, maleimides and sulfonamides.

The peracid precursor activators used herein may be represented structurally as

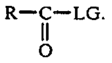

That is, they contain a carbonyl group attached to a leaving group "LG" which is displaced when the peracid forms and an "R" group which is an organic residue of 1 to 20 carbon atoms. The weakly acidic solubilizer group or groups "SG" can be attached to either the R or the LG portion of the molecule.

The SG group may be selected from groups such as a —COOM, a —CSOH, an aromatic —OH, an aromatic —SH, a

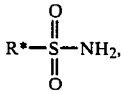

, a

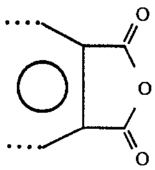

or a

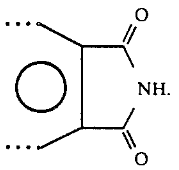

In these typical SG group structures, R* is an organic linking or bridging group typically having less than about 8 carbon atoms. Representative R* groups are alkylenes of from 1 to about 4 carbon atoms and 6 to 8 carbon atom arylenes and alkarylenes, such as methylene, ethylene, propylene, butylene, phenylene, phenylenemethylene, and the like. Also in these structures, M is hydrogen, an alkali metal ion or an alkaline earth metal ion such as sodium I, potassium I, calcium II or magnesium II. When aromatic groups are present in the SG groups, they can be substituted with alkyls of from 1 to 6 carbon atoms, halogens, e.g., chloros or bromos, acyls of 1 to 4 carbon atoms, other aryls of up to 6 carbon atoms, either pendant or fused, or alkoxies of from 1 to 6 carbon atoms, if desired. Multiple substitution is possible, as well, if desired.

R, the organic residue, contains up to about 20 carbon atoms. It can be a hydrocarbon such as a branched or straight chain alkyl or alkenyl, an aryl, an aralkyl, an alkaryl or the like or a substituted hydrocarbon such as an either or an amine. Typically, R may be selected from alkyls and alkenyls of from 1 to about 20 carbon atoms, aryls, alkaryls and aralkyls of from 6 to about 12 carbon atoms, ethers of from about 4 to about 8 carbon atoms and 1 to 3 oxygen atoms, and alkyl amines of from about 3 to about 8 carbon atoms and 1 amine nitrogen atom. An SG group can be attached to this R group, if desired.

LG, the leaving group, is generally an aromatic moiety, in particular, often an aryloxy group of from about 6 to about 12 carbon atoms. Representative LG groups include

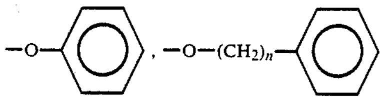

(wherein n equals from 1 to about 4) and the like. In such LG groups, the aromatic ring may be substituted with one or more SG groups and/or with one or more alkyl, halogen, acyl, aryl, or alkoxy groups, if desired.

The activators used in accord with this invention will always include at least one SG group. It is possible for them to contain more than one SG group, for example two, three or four such groups so long as the activators have the required solubility properties. If two or more SG groups are present, they can be the same or different and located in the same region of the activator or in different regions.

Thus, typical activators which would be useful herein because of their insolubility in storage and solubility in use are as shown in Table I.

Table I

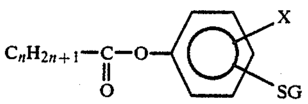

wherein
- X is hydrogen, lower alkyl, lower acyl, or lower alkoxy, wherein "lower" means from 1 to 4 carbon atoms, an aryl of about 6 carbon atoms, or a chloro, bromo or iodo;
- n is 1 to 20; and
- SG is as defined above.

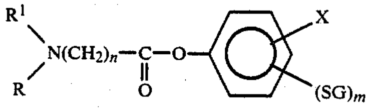

wherein
- n is 1 to 20,
- m is 1 or 2,
- $R^1$ and R each are H or $C_{n'}H_{2n'+1}$, and
- n' is 1 to 20.

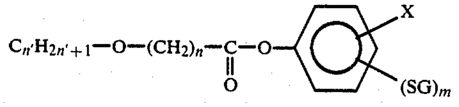

wherein
- n' is 1 to 20, and
- n is 1 to 20.

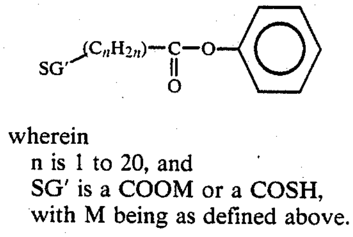

wherein
- n is 1 to 20, and
- SG' is a COOM or a COSH, with M being as defined above.

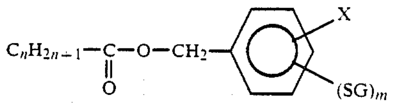

wherein
- n is 1 to 20, and
- m is 1 or 2.

One preferred group of activators can be described structurally as having the formula

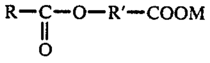

wherein R is an alkyl of 1 to 12 carbon atoms and R' is an arylene group of 6 carbon atoms, optionally with an "X" substituent as above described, which will exert an electron withdrawing effect in the central

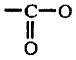

group to promote substitution by perhydroxyl ions ($OOH^-$). M is hydrogen, an alkali metal ion, or an alkaline earth metal ion - usually either $K^+$ or $Na^+$. (If M is a metal ion, when the activator is placed in an acidic medium, the metal ion will immediately be substantially replaced by hydrogen.) Such an activator can undergo the following reactions in pH 7 or greater aqueous media:

Solubilization

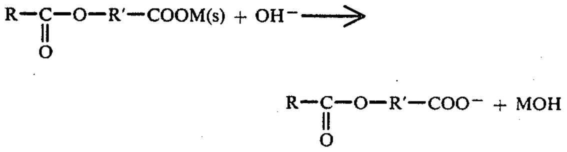

Activation

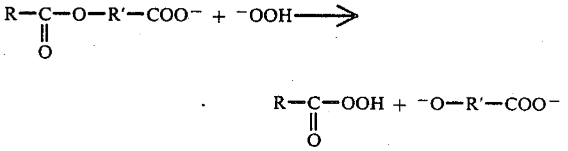

Preferred R groups have from 3 to 10 carbon atoms with 5 to 9 carbon atom R groups being more preferred and normal $C_7$ alkyls being the most preferred. R' can preferably be selected from 6 or 10 carbon atom arylenes which optionally contain up to two alkyl substitutents totaling up to 8 carbon atoms. Phenylene is the most preferred R' group in this class of activator.

Taking the above-defined preferences into account one can define a more preferred group of activators as having the formula

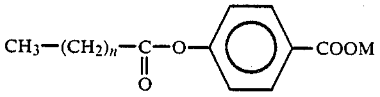

wherein n is an integer from 2 to 8 especially 4 to 8 and more preferably about 6 and M is hydrogen, $Na^+$ or $K^+$. The COOM group can be at various positions on the aromatic ring, with the position para to the —O— link being preferred.

The above described activators can be produced by methods known in the art. For example, preparations of preferred materials set forth above are set out in European Patent Application No. 0,105,673 of Procter and Gamble; Kirk-Othmer, Encyclopedia of Chemical Technology, volume 22, pages 347–348, John Wiley & Sons, New York, 1983; and Organic Syntheses, collective volume 4, pages 635–638, John Wiley & Sons, New York and London, 1963. One generally applicable process for forming the $$R-\underset{\underset{O}{\|}}{C}-O-R'-COOM$$

activators involves 1. forming an anhydride of the formula $$R-\underset{\underset{O}{\|}}{C}-O-\underset{\underset{O}{\|}}{C}-R$$

by condensing two molecules of $$R-\underset{\underset{O}{\|}}{C}-OH$$

acid in the presence of excess acetic anhydride under dehydration conditions, and 2. reacting the anhydride so formed with a hydroxy-substituted acid of the formula $$HO-R'-COOM$$

generally in the presence of strong acid. An alternative process proceeds through acid chlorides and is demonstrated herein in the Preparations. The activators can be recovered as solids and are used as particulate solids in the bleach products of this invention. They are generally ground or otherwise divided to a size of about 140 mesh or smaller (preferably to a size of 1000 microns or less and more preferably to a size of 500 microns or less mesh to facilitate their dispersal or suspension in the bleach products.

The solid activator is added in amounts of from about 0.1 to about 10.0 moles per mole of hydrogen peroxide. Since the activator is more expensive than hydrogen peroxide it is preferred for economic reasons not to use large excesses of activator so that amounts of from 0.2 to 2 moles of activator per mole of hydrogen peroxide, and especially 0.3 to 1 mole of activator per mole of hydrogen peroxide are preferred.

The stabilized activated liquid bleach compositions of this invention may contain additional components such as fragrances, colorants, fluorescent whitening agents (optical brighteners), cleansing agents and thickeners or suspending agents. In addition, supplementary peroxide stabilizers, such as heavy metal chelating liquids, for example EDTA, can be added if desired. In selecting such components it is important not to choose matrials which will react with and destabilize the hydrogen peroxide during storage. It is also important to assure the product's acidic pH with acid additions if needed if the other components lead to a rise in the pH.

Fragrances and colorants can be selected from materials of the art subject to the above provisos regarding stability and pH.

Representative fluorescent whitening agents include the naphtholtriazol stilbene and distyryl biphenyl fluorescent whitening agents sold by the Ciba-Geigy Corporation under the trademarks Tinopal RBS and Tinopal BS-X respectively. Other useful whiteners are disclosed in columns 3,4, and 5 of U.S. Pat. No. 3,393,153 and further useful whiteners are disclosed in ASTM publication D-553A, *List of Fluorescent Whitening Agents for the Soap and Detergent Industry,* which disclosures are incorporated herein by reference. Representative surfactants include conventional nonionic, ampholytic and zwitterionic surfactant materials as are described in the art. Examples of suitable surfactants for use in these formulations may be found in Kirk-Othmer, *Encyclopedia of Chemical Technology,* 3rd Edition, volume 22, pages 247–387 (1983) and McCutcheon's *Detergents and Emulsifiers,* North American Edition (1983). These two disclosures are incorporated herein by reference. A generally preferred group of surfactants are the nonionic surfactants such as are described at pages 360–377 of Kirk-Othmer. Nonionic materials include alcohol ethoxylates, alkyl phenol ethoxylates, carboxylic acid esters, glycerol esters, polyoxyethylene esters, anhydrosorbitol esters, ethoxylated anhydrosorbitol esters, ethoxylates of natural fats, oils and waxes, glycol esters of fatty acids. carboxylic amides, diethanolamine condensates, monoalkanolamine condensates, polyoxyethylene fatty acid amides, polyalkylene oxide block copolymers, poly(oxyethylene-co-oxypropylene) nonionic surfactants and the like. A wide range of such materials are available commercially, including the Shell Chemical Neodols, the Union Carbide Tergitols, the ICI Tweens and Spans and the like.

Representative suspending agents or thickeners include the surfactants just described with preference being given to the sorbitan esters (anhydrosorbitol ester) and the ethoxylated sorbitan esters with special preference being given to mixtures of these materials. The "Span" and "Tween" materials of ICI are such materials and give good results as suspending agents. Other generally preferred suspending agents include polyoxyethylene/polyxoypropylene block copolymers such as are marketed by BASF-Wyandotte as "Pluronic" surfactants, and the polyacrylic acids marketed by B. F. Goodrich under the trademark "Carbopol".

Representative thickening agents including water-soluble gums such as the seaweed gums - including gum arabic, gum guar, and the like - cellulose derivatives, clays, and colloidal silicas, so long as heavy metal contamination is removed.

The bleach formulations of the invention are simply prepared by admixing the hydrogen peroxide with the activator and with any of the above-described optional ingredients and diluting to the proper concentration.

As already noted, the activator is present in a finely divided form. It may be added as such or may, if desired, be formed in situ. This can involve starting with the activator as a soluble solution at, for example, pH 10 in the absence of peroxide, and therafter lowering the pH to an acidic value by acid addition, thereby creating a condition under which the activator is insoluble and percipitates. This can result in a fine particulate activator being formed in situ. Thereafter the peroxide is added. The product is generally packaged in bottles but can also be marketed in other liquid-tight containers such as pouches or the like.

The liquid bleach compositions of this invention are used following conventional laundry practices. They are added in amounts adequate to provide effective soil and stain removal. This is accomplished with additions that are adequate to generate about 5 to 30 parts per million by weight of peracid in the final wash mixture. For a standard 68 liter wash water volume this is 6 to 34 grams of activator and 0.72 to 5 grams of hydrogen peroxide. In conformance with normal laundry practice, the liquid bleaches of this invention may be used in conjunction with laundry soaps and detergents, with fabric softeners and with other materials conventionally employed in laundry processes.

The bleach liquid can be added directly to the fabric to remove spots and the like or it can be added to the wash liquid. In either event, washing should be undertaken promptly after bleach addition, i.e. within an hour or so and preferably within about 15 minutes so as to avoid color damage from prolonged contact with the concentrated bleach as well as to minimize loss of active oxygen due to decompositon at the conditions of washing.

Since the bleaches of this invention require a basic pH to achieve activator solubilization, they work better when used together with a detergent or wash aid or the like which provides a mildly alkaline pH wash liquid. Thus such detergents and the like can advantageously be selected from mildly alkaline materials such as sodium carbonate, sodium silicate, STPP-phosphate, and the like.

The invention will be further described by the following preparations and examples which are furnished as illustrations and are not to be construed as limiting the scope of the present invention.

PREPARATION 1

A 2-liter four neck round bottom flask was equipped with a paddle stirrer and condenser with drying tube. To this flask was added tetrahydrofuran (THF), 500 ml, followed by solid p-hydroxybenzoic acid (150 g, 1.1 mole). Upon stirring for a few minutes all the solid dissolved. To this solution was added pyridine (180 ml, 2.2 mole), followed by octanoyl chloride (191 ml, 1.1 mole) from a dropping funnel over a period of one-half hour. The white solid pyridine hydrochloride began to precipitate from solution as soon as the acid chloride was added. This slurry was stirred at room temperature for approximately three hours.

The solid was removed by filtration and the clear filtrate placed on a rotary evaporator to remove the solvent, a slurry resulted. To the slurry was added hexane (~300 ml), the mixture stirred for one-half hour and filtered to give a white solid.

This white solid was dissolved in distilled water (1 L) and the pH adjusted to about 1.0 with dilute hydrochloric acid; a large amount of white solid now precipitated from solution. The solid was isolated by filtration and dried in a vacuum oven. The dried solid gave 184.5 g (64% yield) of white solid with m.p. 150°-151.5° C. An infrared spectrum of the material showed a sharp peak at 1768 $cm^{-1}$ for an aromatic ester and a peak at 1690 $cm^{-1}$ for an aromatic carboxylic acid. The $^{13}C$-NMR ($CDCl_3$, downfield from TMS) showed acid carbonyl at 171.6ppm, ester carbonyl at 171.5, aromatic carbon attached to oxygen at 155.3, aromatic carbon attached to carbonyl at 126.8, aromatic carbons adjacent to ester at 121.7, aromatic carbons adjacent to carbonyl at 131.9, and aliphatic carbons in the range 14.0-34.4. No other lines, except those for the desired compound were present, indicating this solid was of high purity.

The product was insoluble in distilled water (pH 7) but soluble in alkaline water (pH 9.5, 10.5).

PREPARATION 2

Following the methods set forth in Preparation 1 but substituting n-nonanoyl chloride for n-octanoyl chloride, the corresponding n-nonanoic acid ester activator is produced.

PREPARATION 3

Following the methods set forth in Preparation 1 but substituting n-heptanoyl chloride for n-octanoyl chloride, the corresponding n-heptanoic acid ester activator is produced.

EXAMPLE I

Two liquid bleaches according to this invention were prepared having the following formulations:

| | Formulation 1 | Formulation 2 |
|---|---|---|
| $H_2O_2$ (6%) | 87% | 67% |
| p-(n-octanoyloxy)benzoic acid (solid particulate activator) | 13% | 13% |
| Arlacel 83 (anhydrosorbitol ester) | 0% | 12% |
| Tween 40 (ethoxylated sorbitan palmitic acid ester) | 0% | 8% |

In Formulation 1 the mole ratio of $H_2O_2$ to activator was 3:1. In formulation 2, the mole ratio was 2.4:1. Both Formulations 1 and 2 have three times excess the amount of hydrogen peroxide and enough benzoic acid ester to theoretically generate 14 ppm peracid (as active oxygen) in a 68 L wash when ½ cup of the Formulation is used. The pH of each of the Formulations was buffered to 4 with phosphoric acid. In Formulation 2, the Arlacel and Tween surfactants yielded a pourable thickened liquid suspension product.

COMPARATIVE FORMULATIONS

Three comparative Formulations (A, B, C) were prepared having the following compositions:

| | Formulation | | |
|---|---|---|---|
| | A | B | C |
| $H_2O_2$, 6% | 87% | 87% | 67% |
| p-(n-octanoyloxy)-benzoic acid | 0 | 0 | 0 |
| p-(n-octanoyloxy) benzene sulfonic acid | 0 | 13 | 0 |
| Water | 13 | 0 | 13 |
| Arlacel 83 | 0 | 0 | 12 |
| Tween 40 | 0 | 0 | 8 |
| pH | 4 | 4 | 4 |

Formulation B was a duplicate of Formulation 1 except that instead of an insoluble activator as called for in the invention, a sulfonic acid solubilized material disclosed in the art (U.S. Pat. No. 4,412,934) was employed as activator. Formulations A and B did not contain activators but otherwise mirrored Formulation 1 and 2.

The two formulations of the invention and three comparative formulations were tested as bleaches in room temperature test washes at neutral to basic pH's. It was observed that Formulations 1 and 2 completely dissolved in the wash liquid and together with B gave positive bleaching results while Formulations A and C, which lacked activators, did not give acceptable bleaching at low temperatures.

Next the formulations were tested for stability. Formulation B, which contained the soluble sulfonate group-containing activator, quickly (5 days @ 70° F., 1 day at 100° F.) gave off a strong peroxide odor and developed an objectionable layer of peracid rich oil. Formula B also bulged its plastic container, indicative of oxygen gas generation. Clearly, the system is unstable.

Surprisingly, formulations 1 and 2 of the invention were outwardly stable. Formulations A and C, which had been unacceptable as bleach, gave no outward indications of instability.

Hydrogen peroxide stability was monitored by ceric sulfate titrations with the results shown in Table 2. Peracid concentration was measured by cold thiosulfate titration. The stability of the benzoic acid ester was determined indirectly by the measurement of peracid generation from the formulations when added to a high pH solution (pH=10.5). The amount of peroctanoic acid generated by the addition of 2 g of formulations 1 and 2 to 500 ml of pH=10.5 buffer is shown in Table 3.

TABLE 2

$H_2O_2$ Stability

| Time (days) | Formulation 1 70° F. exp. | Formulation 2 70° F. exp. (m/l $H_2O_2$) | Formulation 2 70° F. control | Formulation 2 100° F. exp. | Formulation 2 100° F. control |
|---|---|---|---|---|---|
| 0 | 1.85 | 1.24 | 1.37 | 1.27 | 1.41 |
| 5 | | 1.26 | 1.39 | 1.23 | 1.36 |
| 7 | 1.82 | | | | |
| 9 | | | 1.41 | 1.16 | |
| 14 | | 1.16 | 1.41 | 1.16 | 1.32 |
| 20 | 1.74 | | | | |
| 24 | | 1.18 | 1.37 | 1.08 | 1.32 |

TABLE 3

Peracid Generation After 14 Days of Storage

| | Formulation 1 70° F. | Formulation 2 70° F. | Formulation 2 100° F. |
|---|---|---|---|
| Peracid generated (m/l) | $1.93 \times 10^{-3}$ | $1.72 \times 10^{-3}$ | $1.26 \times 10^{-3}$ |
| Theoretical peracid generated (m/l) | $1.97 \times 10^{-3}$ | $1.97 \times 10^{-3}$ | $1.97 \times 10^{-3}$ |
| % of theoretical generated | 98 | 87 | 64 |

Approximate extrapolated $H_2O_2$ half lives for Formulation 1 at 70° F. and for Formulation 2 at 70° F. and 100° F. are 325, 325, and 150 days, respectively. The efficient generation of peroctanoic acid after storage of the formulations of the invention shows that the ester is not decomposing rapidly in the acidic solution.

The rapid generation of peracid from the soluble precursor used in Comparative Formulation B has shown that insolubility of the benzoic acid ester is a major factor involved in stabilizing Formulations 1 and 2.

The bleaches of this invention can be used to remove stains, soils and dirt from laundry and demonstrate typical good oxygen bleach performance in such uses.

What is claimed is:

1. A shelf-stable low-temperature-active liquid laundry bleach composition comprising an acidic aqueous medium containing an effective bleach-producing amount of hydrogen peroxide and having dispersed therein an effective activating amount of solid peracid precursor activator having a structure selected from

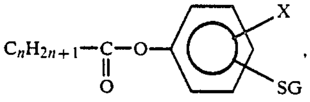
,

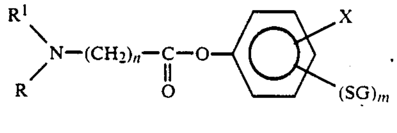
,

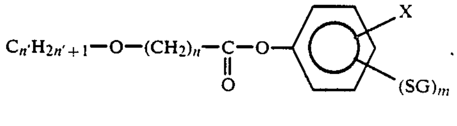
,

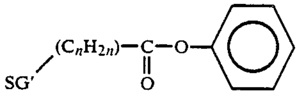
. and

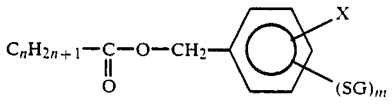

wherein

X is hydrogen, lower alkyl, lower acyl, or lower alkoxy, wherein "lower" means from 1 to 4 carbon atoms, an aryl of about 6 carbon atoms, or a chloro, bromo or iodo;

SG is a solublizing group selected from among —COOM, —COSH, —OH, —SH, an anhydride, a maleimide and a sulfonamide and SG' is a COOM or a COSH with M being hydrogen or an alkali meteal or alkaline earth metal ion;

m is 1 or 2, $R^1$ and R are independently selected from H and $C_{n'}H_{2n'+1}$, n' is an integer of from 1 to 20, and n is an integer of from 1 to 20 that is neither ionized nor soluble in said acidic aqueous medium but that is soluble in alkaline laundry water.

2. The bleach composition of claim 1 wherein said effective bleach-producing amount is a concentration of from about 1% to about 25% by weight.

3. The bleach composition of claim 2 wherein said acidic aqueous medium has a pH of from about 2.0 to just below 7.0.

4. A shelf-stable low-temperature-active liquid laundry bleach composition comprising an acidic aqueous medium having a pH of from about 2.0 to about 6.0 containing from about 1% to about 25% by weight of hydrogen peroxide and having dispersed therein from about 0.1 to about 10 moles per mole of hydrogen peroxide of a solid peracid precursor peroxide activator that is insoluble in said acidic aqueous medium but that is soluble in alkaline laundry water, said activator having a structure selected from

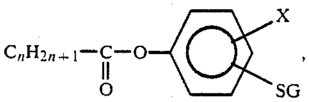

,

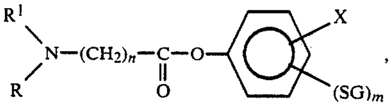

,

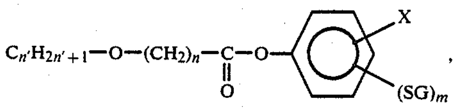

,

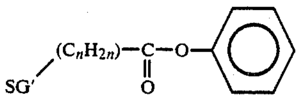

, and

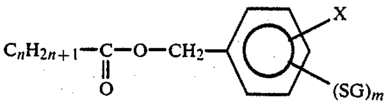

wherein

X is hydrogen, lower alkyl, lower acyl, or lower alkoxy, wherein "lower" means from 1 to 4 carbon atoms, an aryl of about 6 carbon atoms, or a chloro, bromo or iodo;

SG is a solublizing group selected from among —COOM, —COSH, —OH, —SH, an anhydride, a maleimide and a sulfonamide and SG' is a COOM or a COSH with M being hydrogen or an alkali metal or alkaline earth metal ion;

m is 1 or 2, $R^1$ and R are independently selected from H and $C_{n'}H_{2n'+1}$, n' is an integer of from 1 to 20, and n is an integer of from 1 to 20.

5. The bleach composition of claim 4 wherein the activator has the structure

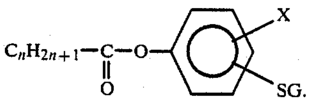

6. The beach composition of claim 5 wherein SG is a —COOM group.

7. The bleach composition of claim 6 wherein X is hydrogen.

8. The bleach composition of claim 7 wherein n is from 3 to 10.

9. The bleach composition of claim 8 wherein n is from 5 to 9.

10. The bleach composition of claim 1 additionally comprising one or more surfactants.

11. The bleach composition of claim 10 wherein the surfactants comprise an admixture of anhydrosorbitol ester and ethoxylated sorbitan ester.

12. The bleach composition of claim 10 additionally comprising a fabric softener.

13. A shelf-stable low-temperature-active liquid laundry bleach composition comprising an acidic aqueous medium having a pH of from about 2.0 to just below 7.0 and containing from about 1% to about 25% by weight of hydrogen peroxide and having dispersed therein solid peracid precursor peroxide activator having a structure selected from

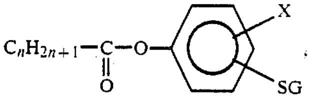

,

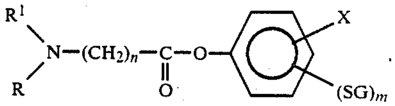

,

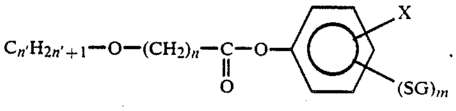

,

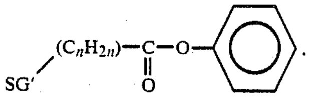

, and

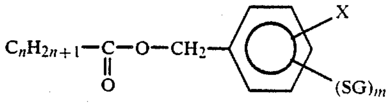

wherein

X is hydrogen, lower alkyl, lower acyl, or lower alkoxy, wherein "lower" means from 1 to 4 carbon atoms, an aryl of about 6 carbon atoms, or a chloro, bromo or iodo;

SG is a solublizing group selected from among —COOM, —COSH, —OH, —SH, an anhydride, a maleimide and a sulfonamide and SG' is a COOM or a COSH with M being hydrogen or an alkali metal or alkaline earth metal ion;

m is 1 or 2, $R^1$ and R independently selected from H and $C_{n'}H_{2n'+1}$, n' is an integer of from 1 to 20, and n is an integer of from 1 to 20 that is insoluble in said acidic aqueous medium but that is soluble in alkaline laundry water said activator being present in an amount of from about 0.1 to about 10 moles of activator per mole of hydrogen peroxide.

14. A method for effective low temperature bleaching of stains or soils from fabric in need of such bleaching which comprises contacting said fabric with a wash solution comprising water and an effective bleach-producing amount of a dispersion of solid particulate peracid precursor hydrogen peroxide activator having a structure selected from

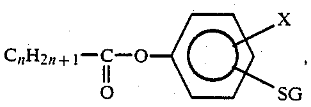

,

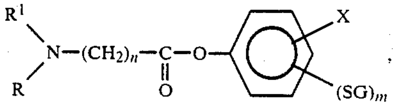

,

-continued

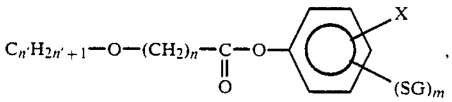

,

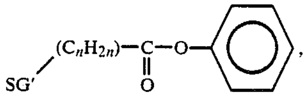

, and

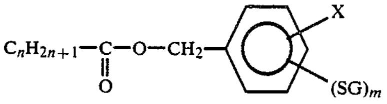

wherein

X is hydrogen, lower alkyl, lower acyl, or lower alkoxy, wherein "lower" means from 1 to 4 carbon atoms, an aryl of about 6 carbon atoms, or a chloro, bromo or iodo;

SG is a solublizing group selected from among —COOM, —COSH, —OH, —SH, an anhydride, a maleimide and a sulfonamide and SG' is a COOM or a COSH with M being hydrogen or an alkali metal or alkaline earth metal ion;

m is 1 or 2, $R^1$ and R are independently selected from H and $C_{n'}H_{2n'+1}$, n' is an integer of from 1 to 20, and n is an integer of from 1 to 20 in acidic aqueous hydrogen peroxide, said wash solution having a pH of greater than 7.0 after said dispersion has been added, wherein said contcting is effected at a temperature of 10° C. to 85° C. for an effective bleaching interval and within 1 hour after said dispersion has been added to produce said wash solution.

15. A shelf-stable low temperature-active liquid laundry bleach composition comprising an acidic aqueous medium having a pH of from about 2.0 to just below 7.0 and containing from about 1% to about 25% by weight of hydrogen peroxide and having dispersed therein solid peracid precursor peroxide activator of the formula

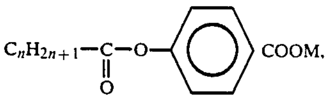

wherein M is selected from hydrogen, the alkali metal ions and the alkaline earth metal ions and n is an integer selected from 6, 7 and 8 said activator being insoluble in said acidic aqueous medium but soluble in alkaline laundry water said activator being present in an amount of from about 0.1 to about 10 moles of activator per mole of hydrogen peroxide.

* * * * *